Oct. 9, 1923. 1,470,118
F. A. SCHAEFER
RESILIENT WHEEL
Filed June 16, 1920 2 Sheets-Sheet 2
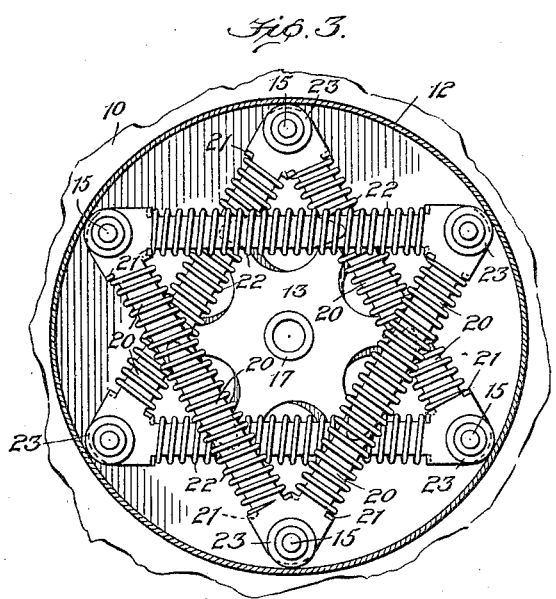
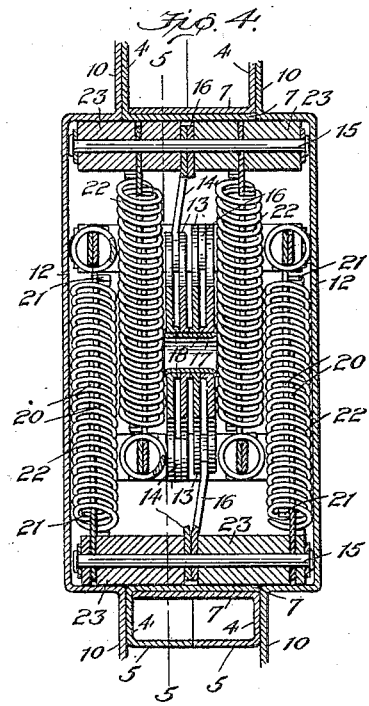
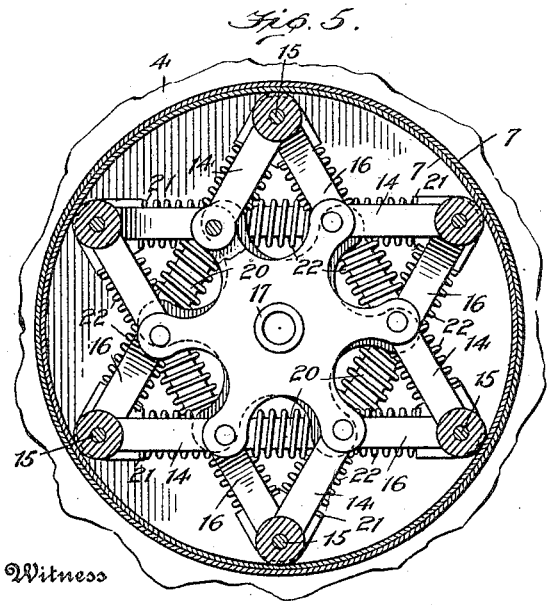
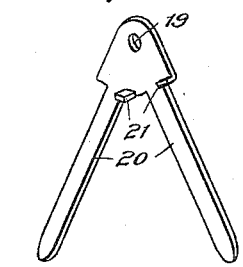

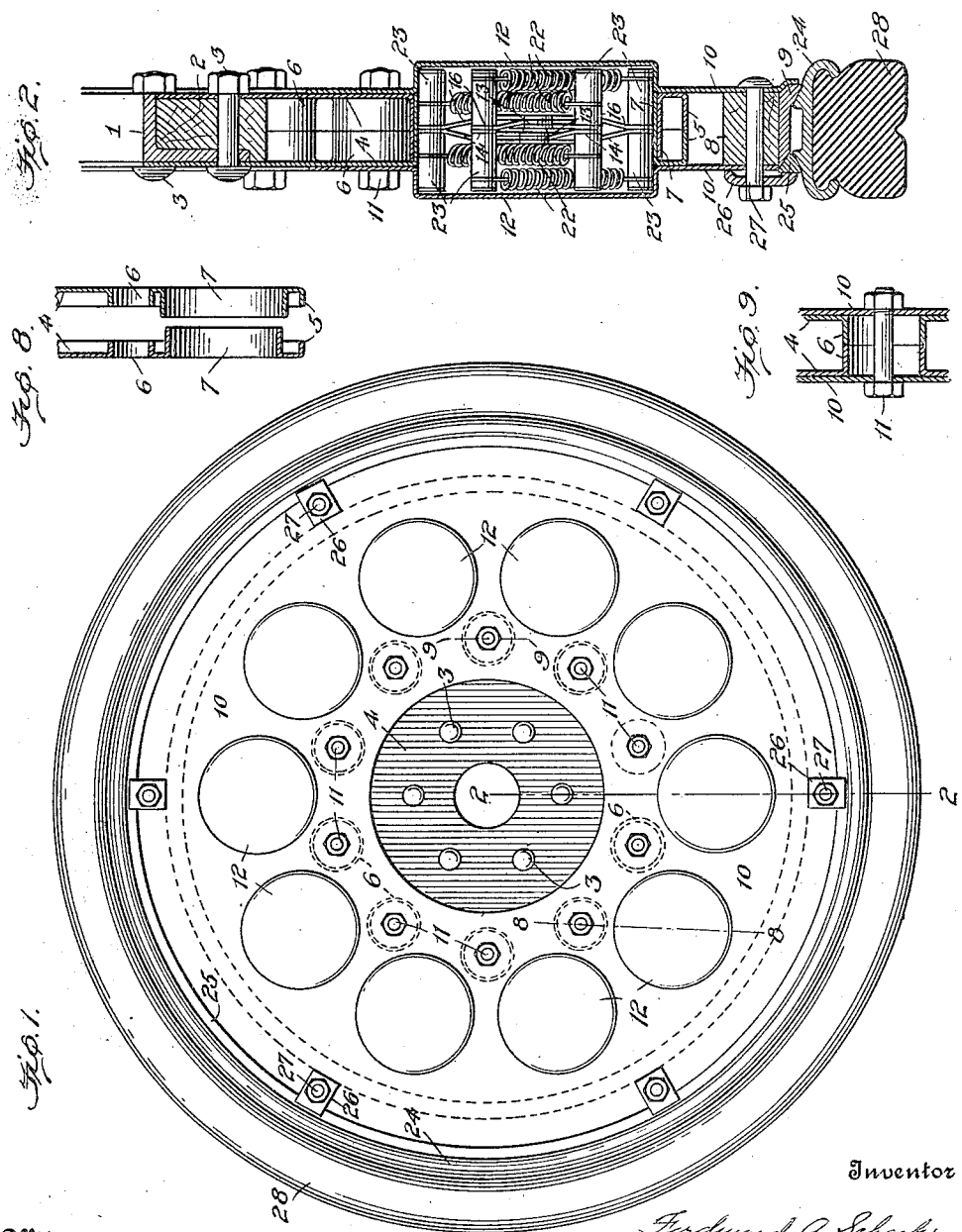

Patented Oct. 9, 1923.

1,470,113

UNITED STATES PATENT OFFICE.

FERDINAND A. SCHAEFER, OF RASPEBURG, MARYLAND.

RESILIENT WHEEL.

Application filed June 16, 1920. Serial No. 389,333.

*To all whom it may concern:*

Be it known that I, FERDINAND A. SCHAEFER, a citizen of the United States, residing at Raspeburg, in the county of Baltimore and State of Maryland, have invented certain new and useful Improvements in Resilient Wheels; and I do hereby declare the following to be a full, clear, and exact description of the invention, such as will enable others skilled in the art to which it appertains to make and use the same.

This invention relates to wheels and more particularly to those of the spring type and designed for vehicles adapted to be motor driven.

The invention provides a wheel readily yieldable to compensate for shock and vibration, and which is braced laterally to resist side stress, said wheel embodying cushioning elements which cooperate, thereby enabling relatively light springs and adjuctive parts being successfully employed and avoiding a heavy and cumbersome construction which is objectionable.

For a full understanding of the invention and the merits thereof reference is to be had to the following description and the drawings hereto attached in which corresponding and like parts are referred to and designated by the same reference characters.

In the drawings:—

Figure 1 is a view in elevation of a vehicle wheel embodying the invention;

Fig. 2 is a transverse section of a portion thereof on the line 2—2 of Figure 1, showing the parts on a larger scale;

Fig. 3 is a side view of one of the cushioning elements and a portion of the casing therefor, showing the parts on a larger scale;

Fig. 4 is a transverse section of a portion of the wheel showing one of the cushioning elements and the parts enclosing the same; the several elements being illustrated on a larger scale;

Fig. 5 is a detail section on the line 5—5 of Fig. 4;

Fig. 6 is a detail, perspective view of one of the link members forming a part of a cushioning element;

Fig. 7 is an end view of the part shown in Fig. 6;

Fig. 8 is a sectional detail of the outer portion of the side plates comprising the hub member, showing the same separated, said view being substantially taken on the line 8—8 of Figure 1;

Fig. 9 is a sectional detail on the line 9—9 of Figure 1.

A wheel constructed in accordance with the present invention embodies an inner or hub member and an outer or rim member. These two members have a relative eccentric movement and cushioning devices are interposed between them for compensating for shock and vibration and sustaining the load.

The hub member comprises a center portion consisting of concentric rings 1 and 2, which are securely fastened in any preferred way. The inner ring 1 is of angle formation in cross section and preferably consists of metal. The outer ring 2 preferably consists of fibrous material, such as wood. The two rings are fastened by means of bolts 3. Side plates 4 are secured to opposite sides of the center portion of the hub and extend in parallel relation and terminate at their outer edges in inwardly extending flanges 5, which are adapted to abut at their inner edges. Two sets of circular openings are formed in each of the side plates 4. The openings of each set are regularly spaced, and the inner openings are of less diameter than the outer openings. Flanges 6 extend inwardly from each of the inner openings, and are adapted to abut at their inner edges. Flanges 7 project inwardly from the outer openings and extend the entire distance between the outer faces of the plates. The flanges 7 of one plate telescope with the flanges 7 of the other plate. This is indicated most clearly in Fig. 4. The flanges 6 and 7 are in line with the respective openings. The outer edge portions of the plates 4 are spaced by the inner flanges 6 and 7, in conjuction with the flanges 5. This construction admits of relatively thin plates being advantageously employed. The overlapping flanges 7 constitute double walls for receiving the cushioning elements.

The rim member comprises a felly 8 and a felly band 9 which is secured thereto in any preferred way. Side plates 10 are secured to the felly 8, and their inner edge portions overlap and lie close against the plates 4 of the hub member, on which they have a sliding movement. Bolts 11 connect the inner edge portions of the plates 10 and pass through the openings enclosed by the abutting flanges 6, as shown most clearly in Fig. 9. The openings receiving the bolts 11, are of such diameter as to admit of the outer or rim portion of the wheel having an eccentric movement so as to obtain the full benefit of the interposed cushioning elements. Each of the side plates 10 has circular portions 12 pressed outwardly to form circular recesses upon the inner sides of said plates, in line with the openings enclosed by the overlapping flanges 7. The circular recesses formed by the pressed out portions 12, coincide with the openings enclosed by the flanges 7, and coact therewith to provide casings in which the several cushioning elements are enclosed. It will be seen on reference to Figs. 2 and 4 that the casings receiving the cushioning elements are completely closed, thereby housing the cushioning elements and excluding moisture and dust and providing for proper lubrication of the parts, which is essential to prolonged and efficient service.

Each cushioning element comprises a plurality of parts embodying plates 13 and co-operating, yieldable connections. The plates 13 are co-axially mounted and have an independent rotary movement. It is preferred to provide the plates 13 in pairs, as shown most clearly in Fig. 4, and each of the plates is formed at its outer edge with projections. Links 14 connect the projections of one set of plates with an element 15, and corresponding links 16 connect the projections of the other set of plates with the element 15. The links 14 and 16 constitute, in effect, a toggle connection between the two sets of plates. Radial movement of the elements 15 causes the inner ends of the links 14 and 16 to move outwardly or inwardly, with the result that the two sets of plates 13 have a reverse rotary movement imparted thereto. As hereinbefore stated, the plates 13 may be single or double, and they are mounted upon a spindle 17, which is common thereto, and which is preferably hollow. The openings formed centrally of the plates 13, are laterally flanged, as indicated at 18, in Fig. 4, so as to provide an extended bearing, as well as inner spacing elements to hold the plates spaced apart the required distance.

The elements 15 consist of rods or pins. A link member is mounted upon each of the elements 15, and is of approximately V-shape, as shown most clearly in Fig. 6. The supporting end of each of the link members is provided with an opening 19, through which the element 15 passes. The diverging elements 20, comprising each of the link members, consist of fingers, the outer ends of which taper slightly. Lateral projections 21, provided at the inner ends of the fingers 20, constitute stops against which expansible helical springs 22 abut. The projections 21 are disposed at opposite sides of the link members, as shown most clearly in Fig. 7, thereby equalizing the stress of the springs 22 thereon. As shown most clearly in Figs. 3 and 5, six pins, or elements 15, are provided, and are disposed equi-distant. The alternate and the intermediate pins or elements 15, are yieldably connected as indicated most clearly in Fig. 3, and these yieldable connections are of equilateral triangular formation, and are disposed so that the angles of one connection intersect the sides of the other triangle. The fingers, or elements, 20, of the link members of the respective triangle connections, overlap and receive springs 22. By having the terminal portions of the fingers 20 made tapering, they are prevented from catching the convolutions of the springs when sliding one upon the other. By having each set of yieldable connections comprising triangular shaped members, substantially as herein indicated, the parts balance, which is essential in order to equalize the stress and load upon the wheel when the latter is in operation. The springs 22 are of the expansible type, hence, they normally tend to force the elements 15 apart, and this outward movement is limited by the outer wall of the casing, in which the cushioning element, as a unit, is housed. It is observed that the cushioning element is free to move in this housing, hence the outer wall of the housing is subjected to a uniform wearing action. Rollers 23 are mounted upon the elements or pins 15, and serve to properly space the several links. The outermost rollers 23 overlap the joints formed between the plates 4 and 10, as indicated most clearly in Fig. 4, thereby equalizing the pressure on the outer wall of the parts of the housing or casing in which the cushioning element is located.

The outer or rim portion of the wheel is shown as having a demountable rim 24, fitted thereto and secured in place by a retaining ring 25 and lugs 26, the latter being held in position by bolts 27, in a manner well understood. The tire 28 may be of any type, and is secured to the rim 24.

In practice, as the outer or rim portion of the wheel sustains the load, it receives an eccentric movement which causes the cushioning elements to be subjected to tension proportionate to the load and stress, as will be readily understood. As the outer or rim portion moves relatively to the inner or hub portion of the wheel, the inner and outer portions of the casings or housing containing the cushioning elements, move relatively to each other, thereby subjecting the elements 15 having a perpendicular relation, to a compressive action, whereby the inner ends of the links 14 and 16 connected thereto, are moved outwardly. This causes the plates 13 to rotate in reverse directions, with the result that the remaining elements 15 are caused to move inwardly. This action subjects all of the springs 22 to a compressive action, whereby to resist the compressive force of the load, which latter is cushioned in a manner to relieve any shock or vibration due to the wheel dropping into a depression in the road, or passing over an obstruction. It is observed that the toggle link connections between the elements 15, are essential to the proper control of the yieldable connections between said elements, and the arrangement is such that relative inward movement of the load-sustaining elements 15 effects a corresponding inward movement of the cooperating elements, whereby the several springs 22 of the yieldable connections, are tensioned, so as to carry the load and relieve shock resulting from any cause.

The pins 15, by reason of their function, constitute load sustaining elements, and the connecting means between said pins comprising the parts 13, 14 and 16, equalize the load and shock, and form, in effect, a toggle connection, and the intermediate spring connecting means yieldably supports the load and neutralizes shock and vibration, all as will be more fully comprehended.

Having thus described the invention, what is claimed as new and desired to be secured by Letters Patent, is:

1. In a vehicle wheel comprising relatively movable hub and rim portions, cushioning means adapted to resist movement thereof, comprising a plurality of load sustaining elements grouped about a central point, a toggle link connection between the load sustaining elements, and expansible springs disposed between opposing load sustaining elements, the springs relatively crossing so as to equalize the strain, the several load sustaining elements having a positive radial movement, and the springs having an approximate tangential arrangement.

2. In a vehicle wheel embodying relatively movable hub and rim portions, cushioning means interposed between such portions, comprising load sustaining elements grouped about a central point, a toggle link connection joining the several load sustaining elements, link members connecting the load sustaining elements and having a relative sliding movement, and expansible helical springs mounted upon complemental elements of the said link members and adapted to be subjected to compression when the load sustaining elements are moved from a predetermined position.

3. A cushioning element for vehicle wheels of the character specified, the same comprising load sustaining elements grouped about a central point, rotary elements disposed coaxially with the center about which the load sustaining elements are grouped, links connecting each load sustaining element with the respective rotary elements, whereby movement of two opposed load sustaining elements effects a corresponding movement of the remaining load sustaining elements, and yieldable connections between the several load sustaining elements and adapted to be compressed by relative movement thereof.

4. Cushioning means of the character specified, comprising load sustaining elements grouped about a central point, a toggle link connection between the several load sustaining elements, link members mounted upon the load sustaining elements and comprising branching elements which are disposed to overlap complemental branching elements of certain other link members, and expansible helical springs mounted upon overlapping elements of the link members.

5. Cushioning means of the character specified, comprising a plurality of load sustaining elements grouped about a central point, a toggle link connection between the several load sustaining elements, link members of substantially V-form mounted upon each of the load sustaining elements and disposed to have the branches of complemental members overlapping, and expansible helical springs mounted upon the overlapping elements of the said V-shaped members.

6. Cushioning means of the character specified comprising a plurality of load sustaining elements grouped about a central point, reversely rotatable elements, links connecting each of the load sustaining elements with the respective rotary elements, link members mounted upon the load sustaining elements and disposed in overlapping relation, and expansible helical springs mounted upon the overlapping link members.

7. Vehicle wheel cushioning means of the character specified, comprising load sustaining elements grouped about a central point, link connecting means between the several load sustaining elements, links mounted upon the load sustaining elements and having an overlapping arrangement, and disposed in triangular form, with the apices of one triangle intersecting the sides of the other triangle, and expansible helical springs mounted upon the overlapping members constituting the sides of the triangles.

8. Cushioning means of the character specified, comprising six load sustaining elements grouped about a central point and equi-distantly spaced, reversely rotatable elements mounted coaxially with the center about which the load sustaining elements are grouped, links connecting each of the load sustaining elements with the respective reversely rotary elements, V-shaped link members mounted upon each of the load sustaining elements and having the branches of the respective alternate and intermediate members overlapping and forming equilateral triangles, with the angles of one intersecting the sides of the other, and expansible helical springs mounted upon the complemental overlapping branches of said link members.

9. A vehicle wheel comprising hub and rim portions, side plates secured to the sides of the hub portion and having openings therein with inner flanges in line with the openings, side plates secured to the rim portion and having openings therein in line with the openings of the side plates connected with the hub portion, and cushioning elements disposed in the coincident openings of the several plates, each of the cushioning elements comprising a plurality of equidistantly spaced load sustaining elements extending across the joints formed between the several plates, a toggle link connection between the several load sustaining elements, and spring connecting means between the load sustaining elements for yieldably carrying the load and compensating for shock and vibration.

10. A vehicle wheel comprising hub and rim members, side plates carried by the hub member and having two sets of openings, other side plates carried by the rim member and overlapping the side plates of the hub member and provided with outwardly pressed portions forming circular recesses which register with one set of openings of the side plates carried by the hub member, bolts connecting the side plates carried by the rim member and passing through the other set of openings of the side plates carried by the hub member, and cushioning means disposed in the openings and registering recesses of the several plates and engaging the walls of the openings of both the hub and rim members and adapted to yieldably support the load and compensate for shock and vibration.

11. In a vehicle wheel, a hub member, side plates carried by the hub member and having two sets of openings, and inner flanges in line with the respective openings, the flanges of one set of openings abutting, and the flanges of the other set of openings telescoping, a rim member, side plates carried by the rim member and overlapping the side plates of the hub member, and formed with outwardly pressed portions forming recesses in coincident relation with the openings of the hub plates provided with the telescoping flanges, fastenings connecting the rim plates and passing through the abutting flange openings of the hub plates to limit the relative eccentric movement of the rim member, and cushioning elements disposed in the said recesses and registering openings of the several plates to carry the load and neutralize shock and vibration.

12. Cushioning means for vehicle wheels, comprising load sustaining elements, rotary elements provided in pairs and having central openings and flanges in line with the central openings to provide an extended bearing and spacing element, a spindle having the rotary element mounted thereon, links connecting the load sustaining elements with the respective rotary members, and spring means connecting the load sustaining elements for yieldably carrying the load and neutralizing shock and vibration.

In testimony whereof I affix my signature.

FERDINAND A. SCHAEFER.